United States Patent
Iwai et al.

(10) Patent No.: US 8,891,471 B2
(45) Date of Patent: Nov. 18, 2014

(54) WIRELESS COMMUNICATION DEVICE, AND WIRELESS COMMUNICATION METHOD

(75) Inventors: Takashi Iwai, Ishikawa (JP); Akihiko Nishio, Kanagawa (JP); Masaru Fukuoka, Ishikawa (JP); Seigo Nakao, Kanagawa (JP); Masayuki Hoshino, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 311 days.

(21) Appl. No.: 13/582,564

(22) PCT Filed: Mar. 17, 2011

(86) PCT No.: PCT/JP2011/001593
§ 371 (c)(1),
(2), (4) Date: Sep. 25, 2012

(87) PCT Pub. No.: WO2011/114742
PCT Pub. Date: Sep. 22, 2011

(65) Prior Publication Data
US 2013/0064227 A1    Mar. 14, 2013

(30) Foreign Application Priority Data
Mar. 19, 2010  (JP) ................... 2010-064430

(51) Int. Cl.
*H04W 72/04* (2009.01)
*H04L 5/00* (2006.01)
*H04J 13/00* (2011.01)
*H04L 25/03* (2006.01)

(52) U.S. Cl.
CPC ........... *H04L 5/0094* (2013.01); *H04J 13/0055* (2013.01); *H04L 5/0048* (2013.01); *H04L 5/0007* (2013.01); *H04W 72/0466* (2013.01); *H04L 25/03159* (2013.01)
USPC ......................................................... 370/329

(58) Field of Classification Search
CPC . H04J 13/0055; H04L 5/0048; H04L 5/0007; H04W 72/0466
USPC ......................................................... 370/329
See application file for complete search history.

(56) References Cited

U.S. PATENT DOCUMENTS

2011/0222489 A1*  9/2011 Awad ............................ 370/329
2012/0263131 A1* 10/2012 Ogawa et al. ................. 370/329
2013/0072242 A1*  3/2013 Iwai et al. ..................... 455/509

OTHER PUBLICATIONS

R1-090257, Panasonic, "System performance of uplink non-contiguous resource allocation", Jan. 12, 2009.
R1-094703, Huawei, "Views on PUSCH Resource allocation", Nov. 9, 2009.
R1-094573, Samsung, "Control Signaling for Non-Contiguous UL Resource Allocations", Nov. 9, 2009.
Alcatel-Lucent Shanghai Bell, Alcatel-Lucent, UL Non-Contiguous Resource Allocation: Performance Analysis and Signaling, 3GPP R1-100923, 3GPP, Feb. 22, 2010.
ZTE, Uplink Non-contiguous Resource Allocation for LTE-Advanced, 3GPP R1-095010, 3GPP, Nov. 9, 2009.
International Search Report for PCT/JP2011/001593 dated Apr. 12, 2011.

* cited by examiner

*Primary Examiner* — Melvin Marcelo
(74) *Attorney, Agent, or Firm* — Pearne & Gordon LLP

(57) ABSTRACT

Disclosed are a wireless communication method and device which can maintain frequency scheduling flexibility and improve system throughput performance. A Walsh sequence number determination unit (108) acquires Walsh sequence numbers used in each cluster according to a bandwidth notification order indicated by a plurality of RIVs, on the basis of associations between the bandwidth notification order indicated by the plurality of RIVs and Walsh sequence numbers used in each cluster. Furthermore, the Walsh sequence number determination unit (108) independently sets the acquired Walsh sequence number to each cluster multiplexed between two different terminals in the same bandwidth.

5 Claims, 18 Drawing Sheets

| WALSH SEQUENCE INFORMATION (1 BIT) | RIV REPORTING TECHNIQUE | WALSH SEQUENCE NUMBER USED IN EACH CLUSTER |
|---|---|---|
| 0 | STRAIGHT REPORTING | CLUSTER#0 : WALSH#0<br>CLUSTER#1 : WALSH#0 |
| 0 | CROSS REPORTING | CLUSTER#0 : WALSH#0<br>CLUSTER#1 : WALSH#1 |
| 1 | STRAIGHT REPORTING | CLUSTER#0 : WALSH#1<br>CLUSTER#1 : WALSH#1 |
| 1 | CROSS REPORTING | CLUSTER#0 : WALSH#1<br>CLUSTER#1 : WALSH#0 |

| WALSH SEQUENCE INFORMATION (1 BIT) | RIV REPORTING TECHNIQUE | WALSH SEQUENCE NUMBER USED IN EACH CLUSTER |
|---|---|---|
| 0 | (SMALL, MIDDLE, LARGE) | CLUSTER#0 : WALSH#0<br>CLUSTER#1 : WALSH#0<br>CLUSTER#2 : WALSH#0 |
| 0 | (SMALL, LARGE, MIDDLE) | CLUSTER#0 : WALSH#0<br>CLUSTER#1 : WALSH#0<br>CLUSTER#2 : WALSH#1 |
| 0 | (LARGE, SMALL, MIDDLE) | CLUSTER#0 : WALSH#0<br>CLUSTER#1 : WALSH#1<br>CLUSTER#2 : WALSH#0 |
| 0 | (LARGE, MIDDLE, SMALL) | CLUSTER#0 : WALSH#0<br>CLUSTER#1 : WALSH#1<br>CLUSTER#2 : WALSH#1 |
| 1 | (SMALL, MIDDLE, LARGE) | CLUSTER#0 : WALSH#1<br>CLUSTER#1 : WALSH#0<br>CLUSTER#2 : WALSH#0 |
| 1 | (SMALL, LARGE, MIDDLE) | CLUSTER#0 : WALSH#1<br>CLUSTER#1 : WALSH#0<br>CLUSTER#2 : WALSH#1 |
| 1 | (LARGE, SMALL, MIDDLE) | CLUSTER#0 : WALSH#1<br>CLUSTER#1 : WALSH#1<br>CLUSTER#2 : WALSH#0 |
| 1 | (LARGE, MIDDLE, SMALL) | CLUSTER#0 : WALSH#1<br>CLUSTER#1 : WALSH#1<br>CLUSTER#2 : WALSH#1 |

FIG.16

WIRELESS COMMUNICATION DEVICE, AND WIRELESS COMMUNICATION METHOD

TECHNICAL FIELD

The present invention relates to a radio communication apparatus and a radio communication method for performing non-contiguous band allocation.

BACKGROUND ART

An uplink of LTE-Advanced, which is the developed 3GPP LTE (3rd Generation Partnership Project Long Term Evolution), involves two techniques under study, i.e., non-contiguous band transmission and MU-MIMO (Multiple User-Multiple Input Multiple Output), in order to enhance scheduling gain by flexible frequency resource allocation.

Firstly, the non-contiguous band transmission will be explained. LTE only has used contiguous band transmission allocating a data signal of each terminal to contiguous frequency bands in order to reduce the CM (Cubic Metric) and the PAPR (Peak to Average Power Ratio). Meanwhile, the uplink of LTE-Advanced has a schedule to use the non-contiguous band transmission in addition to the contiguous band transmission in order to improve cell throughput performance (see, Non-Patent Literature 1).

The non-contiguous hand transmission is a technique to allocate data signals and reference signals to non-contiguous frequency bands widely distributed to a hand. As illustrated in FIG. 1, the non-contiguous band transmission can allocate the data signals and the reference signals to distributed frequency bands. The non-contiguous band transmission thus has enhanced flexibility of the allocation of the data signals and reference signals of terminals to the frequency bands and can acquire larger frequency scheduling effect compared to the contiguous band transmission.

Secondly, MU-MIMO will be explained. MU-MIMO is a technique, which a plurality of terminals perform MIMO communication with a base station, can enhance the frequency use efficiency and thus throughput performance of the system. In MU-MIMO, to demultiplex transmission data of each terminal at a reception side, DM-RSs (DeModulation-Reference Signals) between the terminals need to be orthogonalized. The MIMO can perform space division multiplexing transmission of different signal sequences in the same frequency between a plurality of antennas provided at a transmission station and a plurality of antennas at a reception station.

A conventional technique in which the base station notifies the terminals of non-contiguous hand allocation resource information involves transmission of a plurality of RIVs (Resource Indication Values) to one terminal to notify the terminals of the non-contiguous band allocation (see Non-Patent Literatures 2 and 3).

RIVs forming a tree structure as illustrated in FIG. 2 represent allocation resource information. FIG. 2 illustrates the RIVs tree structure indicating contiguous band allocation in the range of RB#0 to RB#5. For example, when a base station indicates RIV=6, the allocation resource information to terminals includes RB#0 and RB#1 located in the bottom of the tree. When the base station indicates RIV=14, the allocation resource information to the terminals includes RB#2 to RB#4 located in the bottom of the tree. RB#0 to RB#5 located in the bottom of the tree correspond to RIVs=0 to 5, respectively.

When RIVs=0 to 5 in the bottom of the tree are considered as the first stage, RIVs=6 to 10 form the second stage, RIVs=12 to 15 form the third stage, RIVs=18 to 20 form the fourth stage, RIVs=17 and 16 form the fifth stage, and RIV=11 form the sixth stage. 21 patterns of contiguous bands can be indicated from RB#0 to RB#5 located in the bottom of the tree using these RIVs forming the first stage to the sixth stage.

For example, reporting two RIVs can instruct the terminal to perform non-contiguous band allocation of up to two clusters (a set of contiguous bands), as illustrated in FIG. 3. As illustrated in FIG. 4, a bandwidth represented by each RIV may be a part of a system bandwidth, making it possible to reduce the number of signaling bits.

In MU-MIMO, to demultiplex transmission data of each terminal at a reception side, DM-RSs (DeModulation-Reference Signals) of the terminals need to be orthogonalized. FIG. 5 shows a DM-RS transmitting technique for non-contiguous band allocation. This technique generates a ZC (Zadoff-Chu) sequence on a cluster basis, and orthogonalizes DM-RSs of different terminals by the CS-ZC sequences in which different amounts of cyclic shift (CS) are set between the terminals to be MU-MIMO multiplexed. Here, ZC sequence is a code segue

CITATION LIST

Non-Patent Literature

NPL 1
R1-090257, Panasonic, "System performance of uplink non-contiguous resource allocation"
NPL 2
R1-094703, Huawei, "Views on PUSCH Resource allocation"
NFL 3
R1-094573, Samsung, "Control Signaling for Non-Contiguous UL Resource Allocations"

SUMMARY OF INVENTION

Technical Problem

However, in the above mentioned MU-MIMO, the bandwidths and the transmission band positions of the clusters of a plurality of terminals to be MU-MIMO multiplexed need to be perfectly matched in order to maintain the orthogonality of DM-RSs of the terminals by CS-ZC sequences only. Consequently, the clusters of the terminals to be MU-MIMO multiplexed need to be perfectly matched as illustrated in FIG. 6, resulting in reducing the frequency scheduling flexibility and deteriorating the system throughput performance.

It is an object of the present invention to provide a radio communication apparatus and a radio communication method to maintain the frequency scheduling flexibility and to enhance the system throughput performance.

Solution to Problem

The radio communication apparatus of the present invention employs a configuration having: a reception section configured to receive a signal including a plurality of continuous band allocation information indicating continuous band allocation; and an acquisition section configured to acquire control information corresponding to the received plurality of continuous band allocation information based on a relationship where a band reporting order for bands indicated by the plurality of continuous band allocation information is associated with the control information.

The radio communication method of the present invention having the steps of: receiving a signal including a plurality of continuous band allocation information indicating continuous band allocation; and acquiring control information corresponding to the received plurality of continuous band allocation information based on a relationship where a band reporting order for bands indicated by the plurality of continuous band allocation is associated with the control information.

Advantageous Effects of Invention

The present invention can maintain the frequency scheduling flexibility and enhance the system throughput performance.

BRIEF DESCRIPTION OF DRAWINGS

FIG. 16 is a table illustrating that three RIV reporting techniques are associated with sets of three Walsh sequence numbers corresponding to three clusters;

DESCRIPTION OF EMBODIMENT

Figure 1:
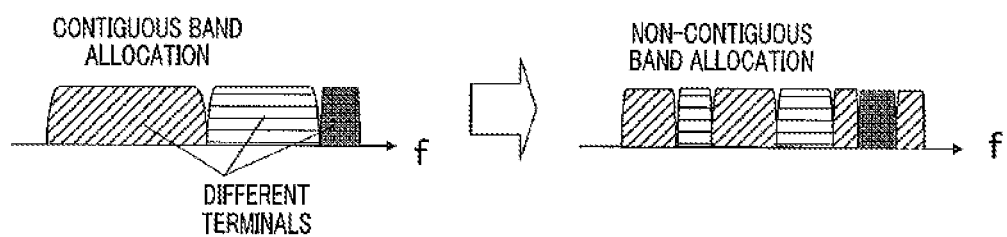
FIG. 1 illustrates contiguous band allocation and non-contiguous band allocation.

Embodiments of the present invention will be described in detail with reference to the accompanying drawings. However, components having the same function will be assigned the same reference numerals in the embodiments and overlapping descriptions thereof will be omitted.

Embodiment 1

Figure 7:
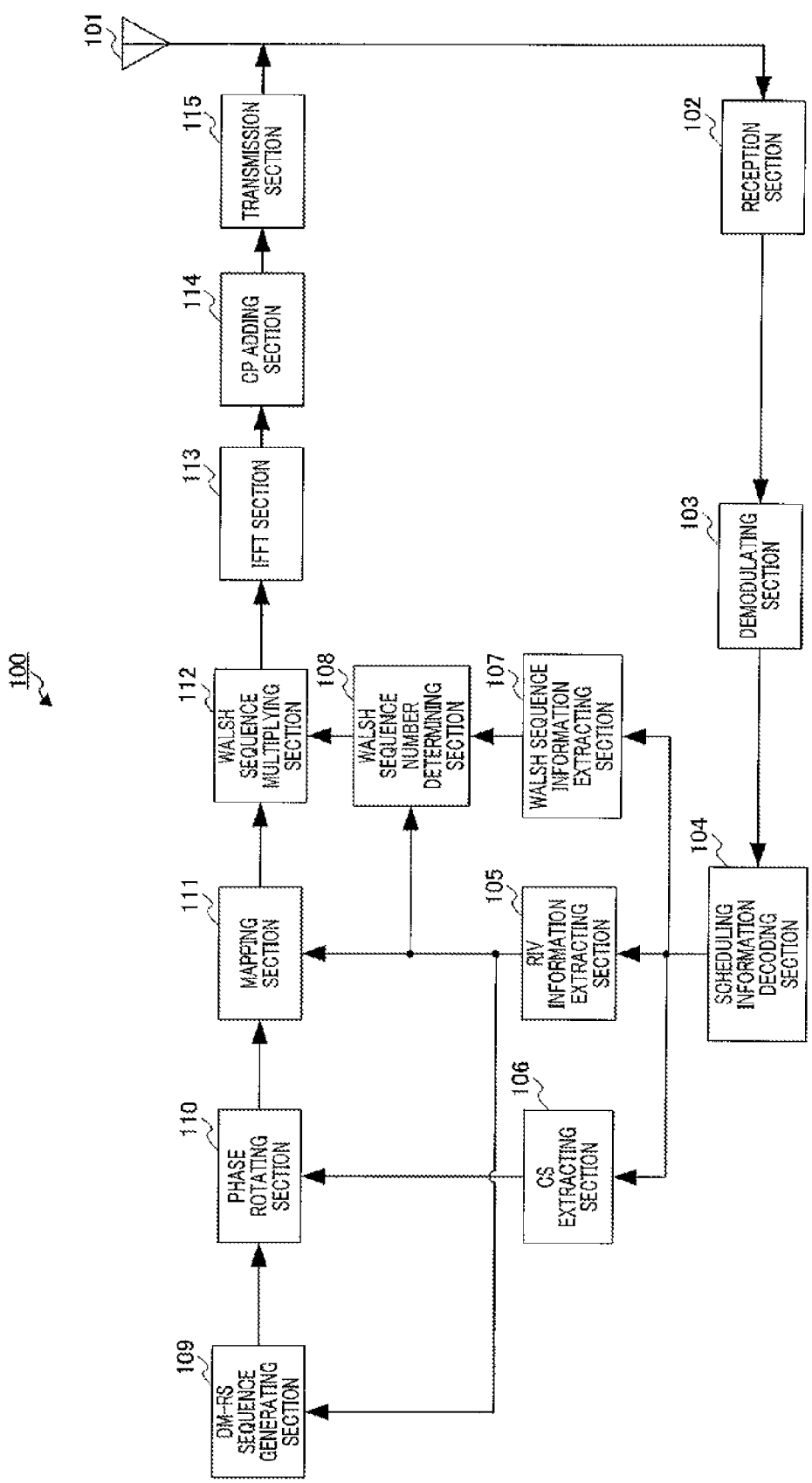
FIG. 7 is a block diagram illustrating a configuration of a radio communication terminal apparatus according to embodiment 1 of the present invention.

FIG. 7 is a block diagram illustrating a configuration of radio communication terminal apparatus (hereinafter referred to simply as "terminal") 100 according to embodiment 1 of the present invention. The configuration of terminal 100 will be described below using FIG. 7.

Reception section 102 receives a signal transmitted from a radio communication base station apparatus (hereinafter referred to simply as "base station") via antenna 101, performs reception processing such as down-conversion and A/D conversion on the received signal, and outputs the received signal subjected to the reception processing to demodulation section 103.

Demodulation section 103 demodulates scheduling information (control information required for generating transmission data) which is transmitted from the base station and included in the received signal output from reception section 102, and outputs the demodulated scheduling information to scheduling information decoding section 104.

Scheduling information decoding section 104 decodes the scheduling information output from demodulation section 103, and outputs the decoded scheduling information to RIV information extracting section 105, CS extracting section 106, and Walsh sequence information extracting section 107.

Figure 2:
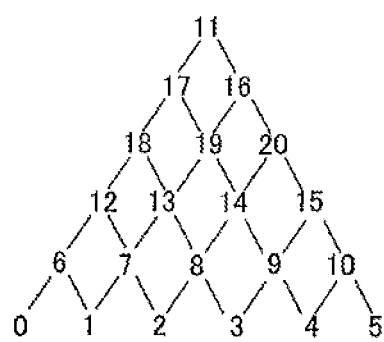
FIG. 2 illustrates a tree structure of RIVs.
Figure 3:
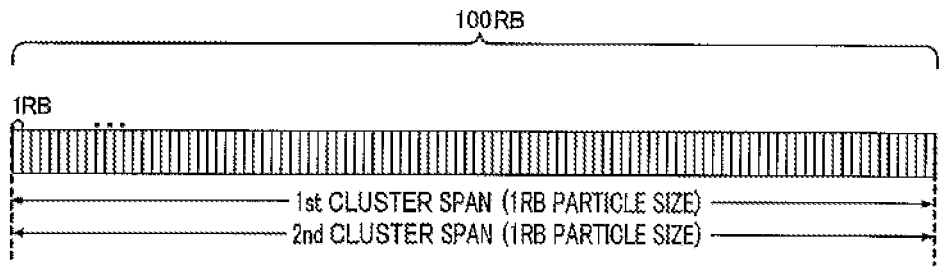
FIG. 3 illustrates the non-contiguous band allocation using a plurality of RIVs.
Figure 4:
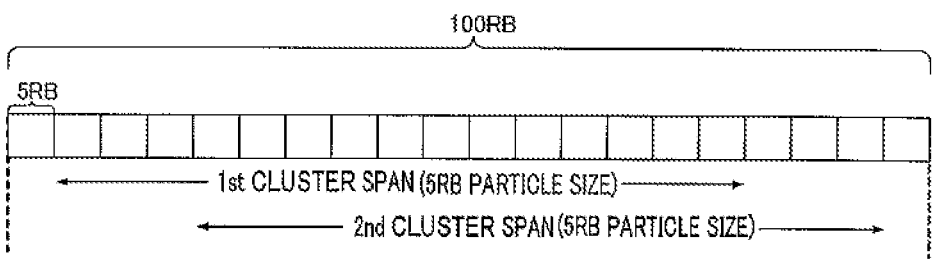
FIG. 4 illustrates the non-contiguous band allocation using a plurality of RIVs.

RIV information extracting section 105 extracts a plurality of RIVs included in the scheduling information output from scheduling information decoding section 104, and acquires bands indicated by the extracted RIVs, in other words, start RB# and end RB#, based on the RIVs tree illustrated in FIG. 2. The acquired start RB# and end RB# are output to Walsh sequence number determining section 108, DM-RS sequence generating section 109, and mapping section 111.

CS extracting section 106 extracts a CS number included in the scheduling information output from scheduling information decoding section 104, and outputs the amount of CS indicated by the extracted CS number to phase rotating section 110.

Walsh sequence information extracting section 107 extracts Walsh sequence information (1 bit) included in the scheduling information output from scheduling information decoding section 104, and outputs the extracted Walsh sequence information to Walsh sequence number determining section 108.

Walsh sequence number determining section 108 acquires Walsh sequence number (Walsh #0 or Walsh #1) used for each cluster indicated by a plurality of RIVs, based on the Walsh sequence information, output from Walsh sequence information extracting section 107 and a comparison between the bands indicated by a plurality of RIVs output from RIV information extracting section 105, and outputs the acquired Walsh sequence number to Walsh sequence multiplying section 112. The method of deriving the Walsh sequence number of each cluster will be described later in detail.

DM-RS sequence generating section 109 generates a band indicated by each RIV output from RIV information extracting section 105, that is, a DM-RS sequence (in case of LTE, a ZC sequence) with a sequence length corresponding to each cluster, and outputs the generated DM-RS sequence to phase rotating section 110.

Phase rotating section 110 applies phase rotation corresponding to the amount of CS in the time domain to each sample of the DM-RS sequence output from DM-RS sequence generating section 109 based on the amount of CS output from CS extracting section 106, and outputs the result to mapping section 111. At this time, the DM-RS sequence means a signal in a frequency domain for allocating each sample to a subcarrier. The phase rotation processing in the frequency domain is equivalent to cyclic shift processing in the time domain.

Mapping section 111 maps the DM-RS sequence output from phase rotating section 110 to a frequency band, based on a band (resource allocation information) indicated by each RIV output from RIV information extracting section 105.

Figure 8:
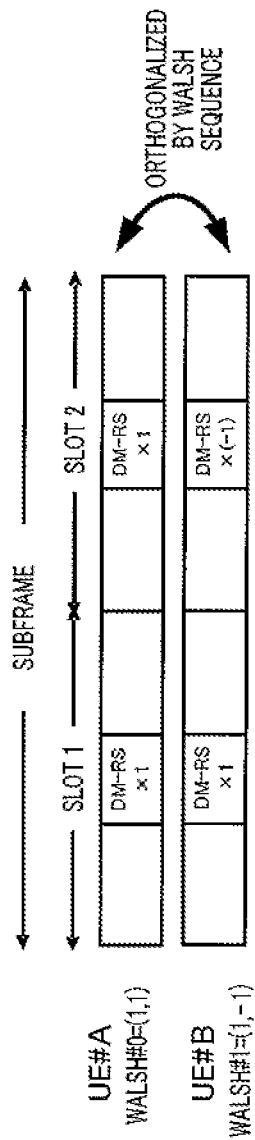
FIG. 8 illustrates the state of multiplying DM-RS by a Walsh sequence.

Walsh sequence multiplying section 112 multiplies the DM-RS of the frequency domain output from mapping section 111 by the Walsh sequence indicated by the Walsh sequence number output from Walsh sequence number determining section 108, and outputs the result to IFFT (Inverse Fast Fourier Transform) section 113. In LTE and LTE-Advanced, a single subframe transmits two DM-RSs, as illustrated in FIG. 8. Accordingly, Walsh sequence multiplying section 112 multiplies DM-RSs of slots 1 and 2 by length-2 Walsh sequence (Walsh #0=(1,1) or Walsh #1=(1,−1)). The Walsh sequences used for this multiplication are respectively set for the clusters. In MU-MIMO communication, even when transmission bandwidths and transmission band positions of the DM-RSs of two different terminals are different, the DM-RSs of the two terminals can be orthogonalized by multiplying the DM-RSs by different Walsh sequences if the time fluctuation of channel between DM-RSs of slots 1 and 2 is sufficiently small.

IFFT section 113 performs IFFT processing on the DM-RS output from Walsh sequence multiplying section 112 and outputs the signal subjected to the IFFT processing to CP (Cyclic Prefix) adding section 114.

CP adding section 114 adds the same signal as the end part of the signal output from IFFT section 113 to the beginning of the signal as CP, and outputs the result to transmission section 115.

Transmission section 115 performs transmission processing such as D/A conversion, up-conversion and amplification on the signal output from CP adding section 114, and transmits the signal subjected to the transmission processing via antenna 101 as the DM-RS.

Figure 9:
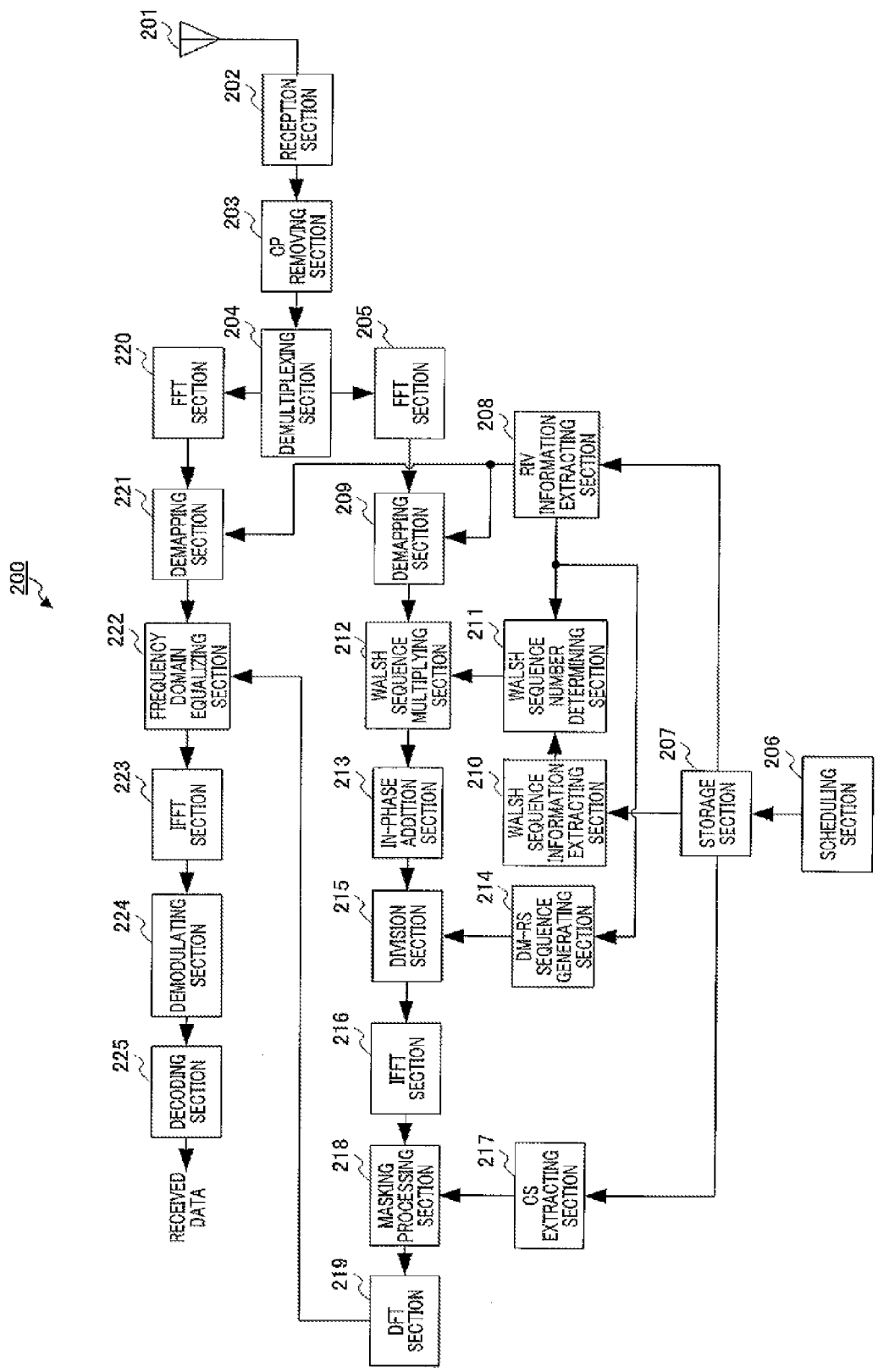
FIG. 9 is a block diagram illustrating a configuration of a base station according to embodiment 1 of the present invention.

FIG. 9 is a block diagram illustrating a configuration of base station 200 of embodiment 1 of the present invention. The configuration of base station 200 is described below using FIG. 9.

Reception section 202 receives the signal transmitted from the terminal via antenna 201, performs reception processing such as down-conversion and A/D conversion on the received signal, and outputs the received signal subjected to the reception processing to CP removing section 203.

CP removing section 203 removes a CP component added to the beginning of the received signal output from reception section 202 and outputs the result to demultiplexing section 204.

Demultiplexing section 204 demultiplexes the received signal output from CP removing section 203 into a DM-RS signal and a data signal, and outputs the DM-RS signal to FFT (Fast Fourier Transform) section 205 and the data signal to FFT section 220.

FFT section 205 performs FFT processing on the DM-RS signal in the time domain output from demultiplexing section 204, converts the DM-RS signal into the DM-RS signal in the frequency domain, and outputs the result to demapping section 209.

Scheduling section 206 determines scheduling information (such as frequency resources, time resources, code resources, and transmission power) required for terminals 100 to transmit transmission signals, notifies the terminals of the determined scheduling information and also outputs the determined scheduling information to storage section 207.

Storage section 207 stores the scheduling information output from scheduling section 206, and outputs the scheduling information notified to the terminals to be demodulated to RIV information extracting section 208, Walsh sequence information extracting section 210, and CS extracting section 217.

RIV information extracting section 208 extracts an RIV from the scheduling information output from storage section 207, and outputs start RB# and end RB# indicated by the extracted RIV to demapping section 209, Walsh sequence number determining section 211, and DM-RS sequence generating section 214.

Demapping section 209 extracts a DM-RS signal corresponding to a transmission band of the desired terminal from the DM-RS signal in the frequency domain output from FFT section 205, based on start RB# and end RB# output from RIV information extracting section 208, and outputs the extracted DM-RS signal to Walsh sequence multiplying section 212.

Walsh sequence information extracting section 210 extracts Walsh sequence information (1 bit) scheduled to the desired terminal based on the scheduling information output from storage section 207, and outputs the extracted Walsh sequence information to Walsh sequence number determining section 211.

Walsh sequence number determining section 211 acquires the Walsh sequence number (Walsh #0 or Walsh #1) used for each cluster indicated by a plurality of RIVs, based on the Walsh sequence information output from Walsh sequence information extracting section 210 and a comparison between the bands indicated by a plurality of RIVs output from RIV information extracting section 208, and outputs the acquired Walsh sequence number to Walsh sequence multiplying section 212.

Walsh sequence multiplying section 212 multiplies the DM-RS signal in the frequency domain output from demapping section 209 by the Walsh sequence indicated by the Walsh sequence number output from Walsh sequence number determining section 211, and outputs the result to in-phase addition section 213.

In-phase addition section 213 performs in-phase addition on two DM-RS signals output from Walsh sequence multiplying section 212 for each cluster, and outputs the result to division section 215. When the time fluctuation of channel between the two DM-RSs is sufficiently small, the in-phase addition processing can remove an interference component (the DM-RS signals of different terminals multiplied by different Walsh sequences).

DM-RS sequence generating section 214 generates a band indicated by each RIV output from RIV information extracting section 208, that is, a DM-RS sequence with a sequence length corresponding to each cluster, and outputs the generated DM-RS sequence to division section 215.

Division section 215 divides the signal of each cluster output from in-phase addition section 213 by the DM-RS sequence output from DM-RS sequence generating section 214, and outputs the division result to IFFT section 216.

IFFT section 216 performs IFFT processing on the division result output from division section 215, and outputs the signal subjected to the IFFT processing to masking processing section 218.

CS extracting section 217 extracts a CS number included in the scheduling information output from storage section 207, and outputs the amount of CS indicated by the extracted CS number, that is, the amount of CS that the terminal adds to DM-RS to masking processing section 218.

Masking processing section 218 extracts an interval in which a correlation value of the desired cyclic shift sequence is present, that is, a correlation value in a window part, by performing masking processing on a DM-RS signal output from IFFT section 216 based on the amount of CS output from CS extracting section 217, and outputs the extracted correlation, value to DFT (Discrete Fourier Transform) section 219.

DFT section 219 performs DFT processing on the correlation value output from masking processing section 218 and outputs the correlation value subjected to the DFT processing to frequency domain equalizing section 222. The signal subjected to the DFT processing is a signal representing a frequency response of a channel.

FFT section 220 performs FFT processing on the data signal in the time domain output from demultiplexing section 204, converts the data signal into the data signal in the frequency domain, and outputs the result to demapping section 221.

Demapping section 221 extracts a data signal corresponding to a transmission band of the desired terminal from the data signal in the frequency domain output from FFT section 220 based on start RB# and end RB# output from RIV information extracting section 208, and outputs the extracted data signal to frequency domain equalizing section 222.

Frequency domain equalizing section 222 performs equalization processing on the data signal output from demapping section 221 using the signal representing channel frequency response output from DFT section 219, and outputs the signal subjected to the equalization processing to IFFT section 223.

IFFT section 223 performs IFFT processing on the data signal output from frequency domain equalization section 222, and outputs the signal subjected to the IFFT processing to demodulating section 224.

Demodulation section 224 performs demodulation processing on the signal output from IFFT section 223 and outputs the signal subjected to the demodulation processing to decoding section 225.

Decoding section 225 performs decoding processing on the signal output from demodulation section 224 and extracts received data.

Next, the operation of Walsh sequence number determining section 108 functioning as an acquisition section of terminal 100 above will be described. The operation of Walsh sequence number determining section 211 of base station 200 is substantially the same as Walsh sequence number determining section 108 of terminal 100 and will not be explained here.

Figure 10:
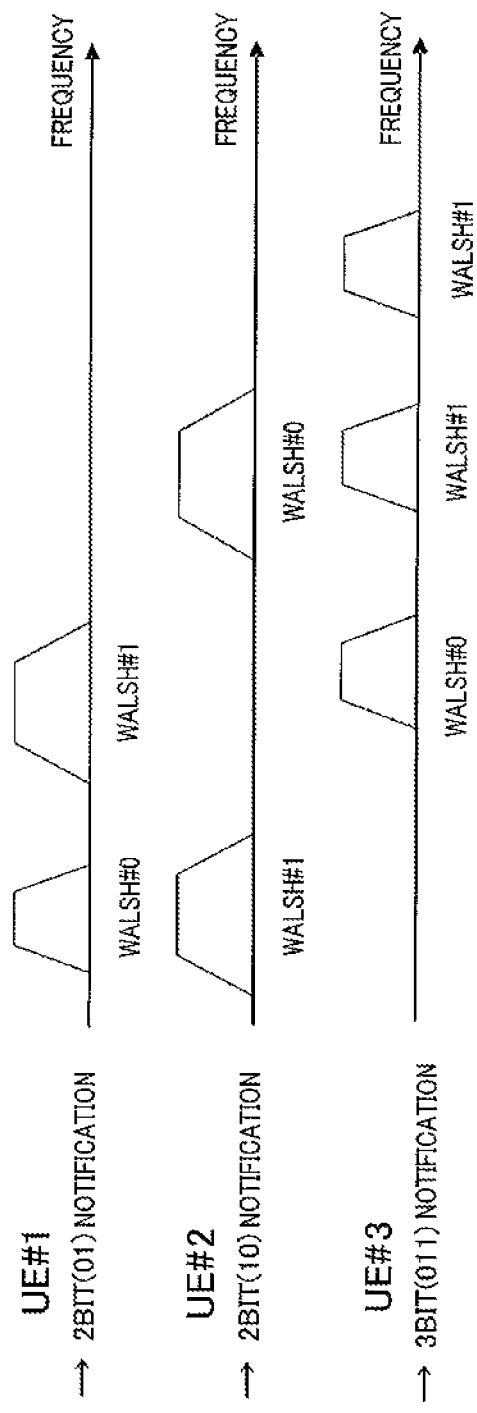
FIG. 10 illustrates a state where Walsh sequence numbers are respectively set to clusters multiplexed between two different terminals in a single band.

As illustrated in FIG. 10, Walsh sequence number determining section 108 sets Walsh sequence numbers to the clusters multiplexed between two different terminals in a single band, respectively. Accordingly, DM-RSs can be orthogonalized even when the bandwidths and transmission band positions of the clusters multiplexed between two terminals are not perfectly matched. This results in enhancement of frequency scheduling gain by non-contiguous band allocation and MU-MIMO multiplexing.

However, in a way to report the Walsh sequence to each cluster, the number of signaling bits increases by one bit with the number of clusters. In FIG. 10, the Walsh sequence information "0" is allocated to Walsh #0 and "1" is allocated to Walsh #1, and Walsh sequence information is reported in ascending frequency order.

At this time, Walsh sequence number determining section 108 associates the order of reporting the bands indicated by a plurality of RIVs with the Walsh sequence number used for each cluster. As illustrated in FIG. 11, this association is made focusing on realizing the same frequency resource allocation even when the order of reporting the bands indicated by a plurality of RIVs is interchanged between the RIVs.

Figure 11A:
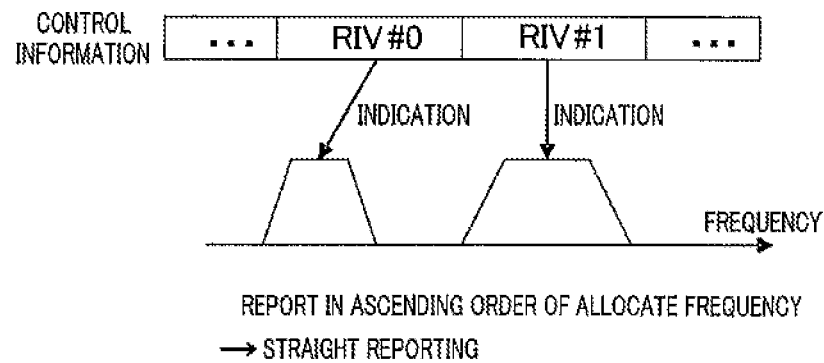
FIG. 11 illustrates examples where two RIVs indicate the non-contiguous band allocation to a terminal.

FIG. 11 illustrates an example that two RIVs (the RIVs are assumed as #0 and #1 in order of bit allocation of control information) indicate non-contiguous band allocation to a terminal. FIG. 11A illustrates a technique to report a band indicated by RIV #0 and a band indicated by RIV #1 in ascending frequency order. In other words, this is the technique to allocate the bands in the reported order (hereinafter referred to as "straight reporting").

Figure 11B:
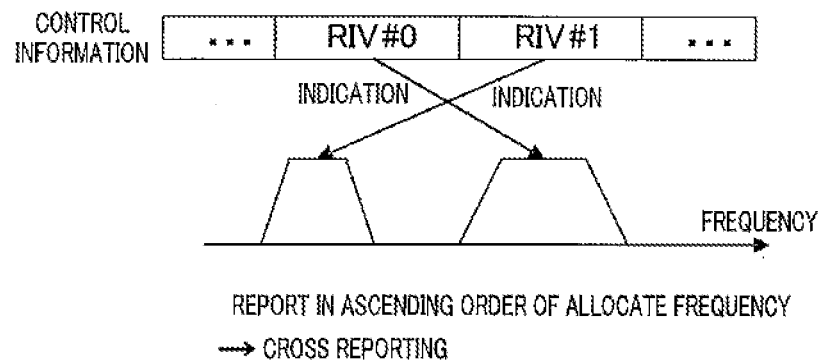

FIG. 11B illustrates a technique to report the band indicated by RIV #0 and the band indicated by RIV #1 in descending frequency order. In other words, this is the technique to allocate the bands in the opposite of the reported order (hereinafter referred to as "cross reporting").

Although the above two techniques differ in the way to report a plurality of RIVs, the frequency resources to allocate signals of terminals are perfectly matched. Thus, in case of reporting two RIVs, additional information of one bit can be reported to the terminals by the technique to report a plurality of RIVs (straight reporting or cross reporting).

Figures 12, 13:
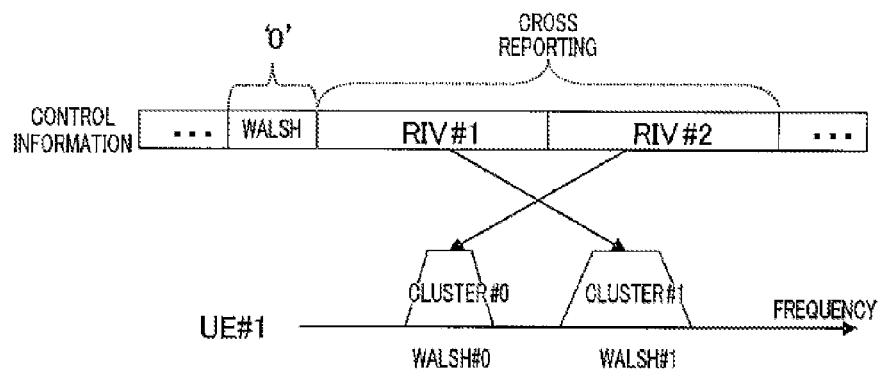
FIG. 12 is a table illustrating that two RIV reporting techniques are associated with sets of two Walsh sequence numbers corresponding to two clusters.
FIG. 13 is an actual example based on the table illustrated in FIG. 12.

In embodiment 1, the additional information included in the technique to report a plurality of RIVs is considered as a Walsh sequence number by which each cluster of the DM-RS is multiplied. FIG. 12 illustrates an actual example associating two RIVs reporting techniques with the Walsh sequence numbers for two clusters.

A terminal detects frequency resource numbers that is in the beginning of each cluster and that is included in the reported RIV information, and determines from the reported order whether the straight reporting or the cross reporting is used. For example, as illustrated in FIG. 13, in case of Walsh sequence information "0" and the cross reporting, cluster #0 corresponds to Walsh #0 and cluster #1 corresponds to Walsh #1 as the Walsh sequences used by the terminal. This association can indicate the two Walsh sequences for two clusters while maintaining the number of signaling bits of the Walsh sequence information as one bit. Consequently, it is possible to decrease the number of signaling bits for reporting the Walsh sequence information.

Figure 14:
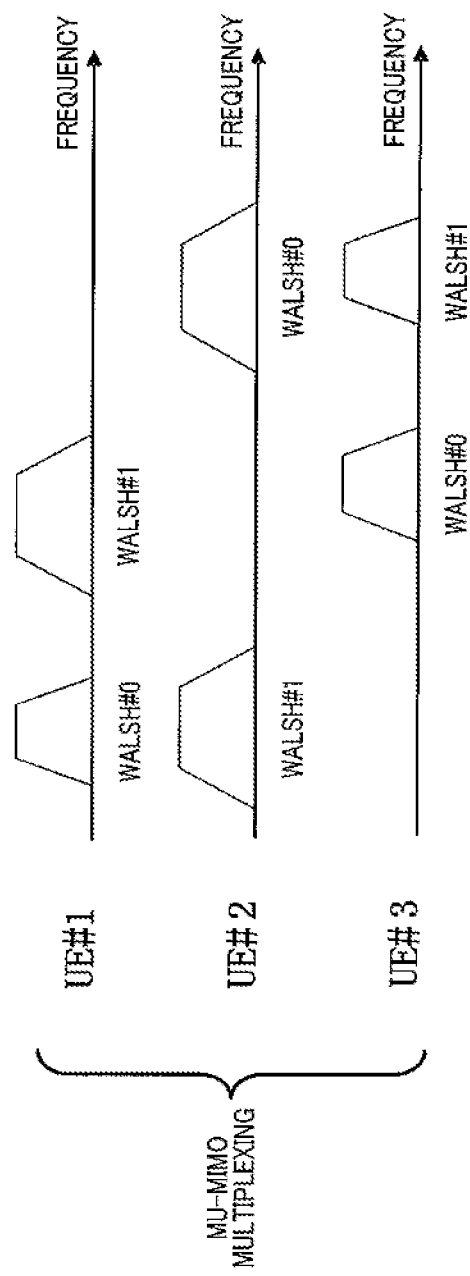
FIG. 14 illustrates a state where DM-RSs are orthogonalized even when clusters multiplexed between two different terminals have different transmission bandwidths.

Also, since the Walsh sequence numbers can be respectively allocated (reported) to the clusters, allocating (reporting) orthogonalized Walsh sequences to the clusters multiplexed between two different terminals can orthogonalize the DM-RSs having different transmission bandwidths, as illustrated in FIG. 14. However, since the Walsh sequence includes only two sequences, when the Walsh sequence numbers are set as UE specific information (common Walsh sequence number is allocated to each cluster in one UE), MU-MIMO between two out of three terminals in three adjacent clusters as illustrated in FIG. 14 cannot be performed, and therefore the frequency scheduling gain is limited.

In this case, even when the number of clusters increases with the number of reporting RIVs, the number of bits required for the Walsh sequence information is not increased because of the association illustrated in FIG. 12. That is, the signaling bit required for reporting the Walsh sequence information may be one bit in both the contiguous band allocation and the non-contiguous band allocation. This one bit may be expressly reported or may be indirectly reported (for example, reported in association with other control information such as a CS number).

According to embodiment 1, even when the clusters of the two terminals are not perfectly matched in bandwidths and transmission band positions, setting the Walsh sequence numbers, respectively, to the clusters multiplexed between the two different terminals in a single band can orthogonalize the DM-RSs, maintain the frequency scheduling flexibility, and enhance the system throughput performance.

Also, according to the association of the order of reporting the bands indicated by a plurality of RIVs with the Walsh sequence number used by each cluster, the order of reporting the bands indicated by a plurality of RIVs can report the Walsh sequence number used by each cluster. By this means, it is possible to prevent the increase of number of signaling bits required for reporting the Walsh sequence information.

Figure 5:
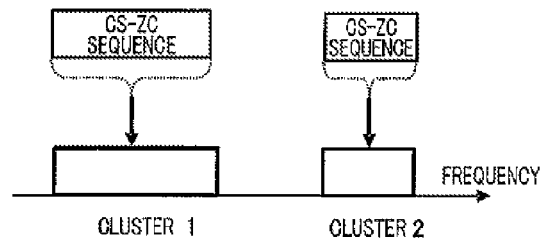
FIG. 5 illustrates a DM-RS transmitting technique for the non-contiguous band allocation.
Figure 6:
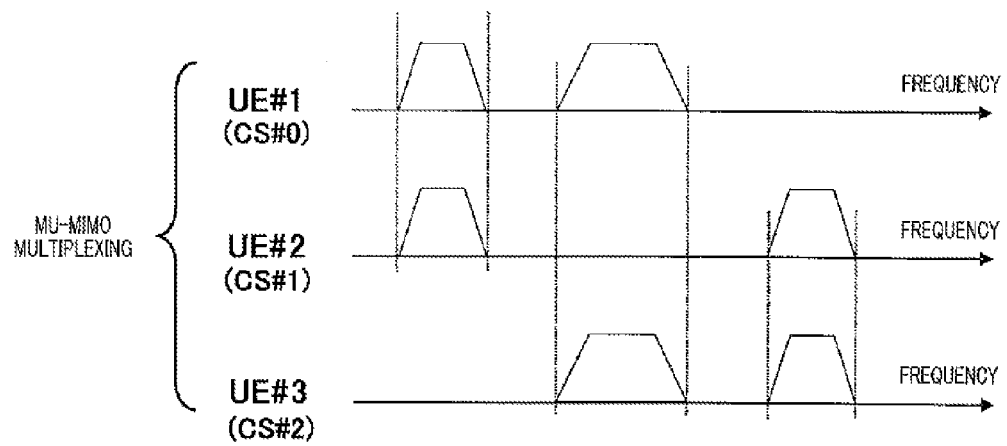
FIG. 6 illustrates the state of perfectly matching clusters of terminals to be MU-MIMO multiplexed.
Figure 15:
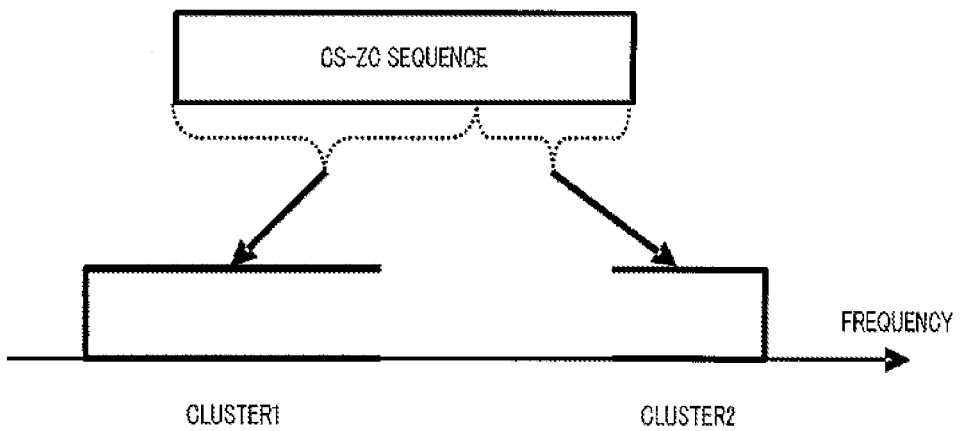
FIG. 15 illustrates the state of generating a DM-RS sequence with a sequence length equal to the total bandwidth of clusters.

Although the present embodiment has explained that DM-RS sequence generating section 109 generates a DM-RS sequence with a sequence length corresponding the bandwidth of each cluster, for each cluster as illustrated in FIG. 5, the present invention is not limited to this, and, as illustrated in FIG. 15, may generate a DM-RS sequence (ZC sequence in LTE) with a sequence length corresponding to the total bandwidth of clusters. As a result, it is possible to acquire the same effect as that illustrated in FIG. 5.

Furthermore, although the present embodiment has explained the allocation using two clusters for each of two RIV reporting techniques, the present invention is not limited to this, and is applicable to the allocation using three or more clusters for each of three or more RIV reporting techniques. For example, as illustrated in FIG. 16, in case of the three clusters allocation, one bit of Walsh sequence reporting bit can set the Walsh sequences to three clusters, respectively. Each term of "small, middle, and large" that is the RIV reporting technique in the table represents the comparison of the bands indicated by RIV #0, RIV #1, and RIV #2 that is in the order of bit allocation of the control information.

Furthermore, although the present embodiment has explained two patterns (Walsh #1 and Walsh #2) of the Walsh sequences as an example, the present invention is not limited to this. Even in case of reporting three patterns or more, associating the Walsh sequences with the RIV reporting techniques can decrease the number of signaling bits.

Embodiment 2

Figure 17:
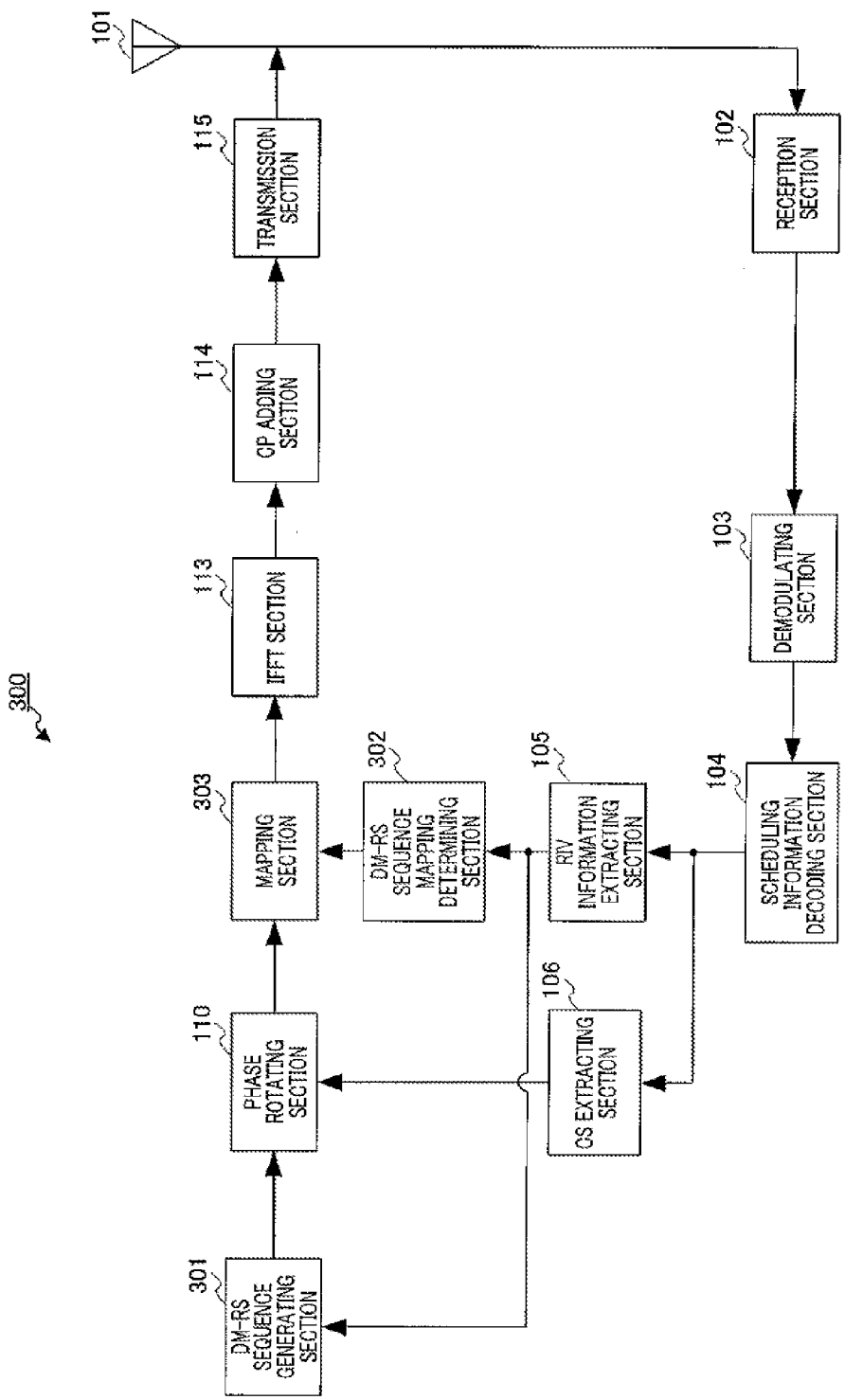
FIG. 17 is a block diagram illustrating a configuration of a terminal according to embodiment 2 of the present invention.

FIG. 17 is a block diagram illustrating a configuration of terminal 300 according to embodiment 2 of the present invention. The configuration of terminal 300 is described below using FIG. 17. However, FIG. 17 differs from FIG. 7 in deleting Walsh sequence information extracting section 107, Walsh sequence number determining section 108 and Walsh sequence multiplying section 112, adding DM-RS sequence mapping determining section 302, changing DM-RS sequence generating section 109 to DM-RS sequence generating section 301, and changing mapping section 111 to mapping section 303.

DM-RS sequence generating section 301 generates the DM-RS sequence (ZC sequence in LTE) with a sequence length corresponding to the entire bandwidth (the total of cluster bands) output from RIV information extracting section 105, and outputs the generated DM-RS sequence to phase rotating section 110.

DM-RS sequence mapping determining section 302 determines mapping information of the DM-RS sequence to clusters based on the comparison between the bands indicated by a plurality of RIVs output from RIV information extracting section 105, and outputs the determined mapping information to mapping section 303. The operation of DM-RS sequence mapping determining section 302 will be described later in detail.

Mapping section 303 maps the DM-RS signals output from phase rotating section 110 to non-contiguous bands, based on the mapping information of the DM-RS sequence to the clusters, the information output from DM-RS sequence mapping determining section 302.

Figure 18:
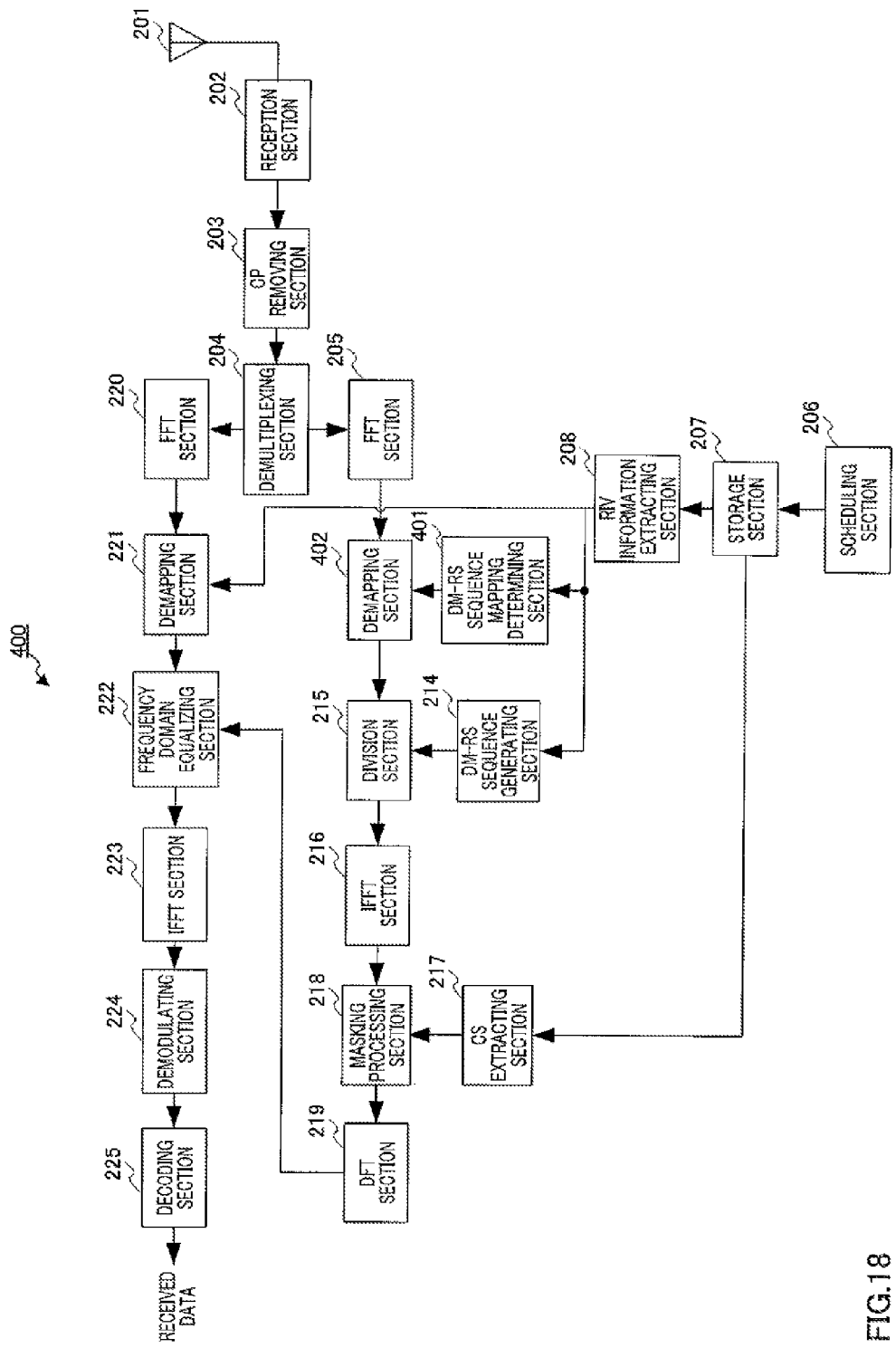
FIG. 18 is a block diagram showing a configuration of a base station according to embodiment 2 of the present invention.

FIG. 18 is a block diagram illustrating a configuration of base station 400 of embodiment 2 of the present invention. The configuration of base station 400 is described below using FIG. 18. However, FIG. 18 differs from FIG. 9 in deleting Walsh sequence information extracting section 210, Walsh sequence number determining section 211, Walsh sequence multiplying section 212, and in-phase addition section 213, adding DM-RS sequence mapping determining section 401, and changing demapping section 209 to demapping section 402.

DM-RS sequence mapping determining section 401 determines mapping information of the DM-RS sequence to clusters based on the comparison between the bands indicated by a plurality of RIVs output from RIV information extracting section 208, and outputs the determined mapping information to demapping section 402.

Demapping section 402 extracts a DM-RS signal corresponding to a transmission band of the desired terminal from the DM-RS signal in a frequency domain output from FFT section 205 based on the mapping information output from DM-RS sequence mapping determining section 401, and outputs the extracted DM-RS signal to division section 215.

Next, the operation of DM-RS sequence mapping determining section 302 functioning as an acquisition section of the above described terminal 300 will be described. The operation of DM-RS sequence mapping determining section 401 of base station 400 is substantially the same as that of DM-RS sequence mapping determining section 302 of terminal 300 and will not be explained here.

As illustrated in FIG. 15, the DM-RS transmitting technique for the non-contiguous band allocation dividing a single ZC sequence into a plurality of clusters has an advantage that CM is small, compared with the DM-RS transmitting technique for the non-contiguous band allocation generating a ZC sequence for each cluster as illustrated in FIG. 5. Meanwhile, there is a disadvantage that the CS-ZC sequences of clusters cannot be orthogonalized even when the ZC sequence lengths of the terminals are the same.

Figure 19:
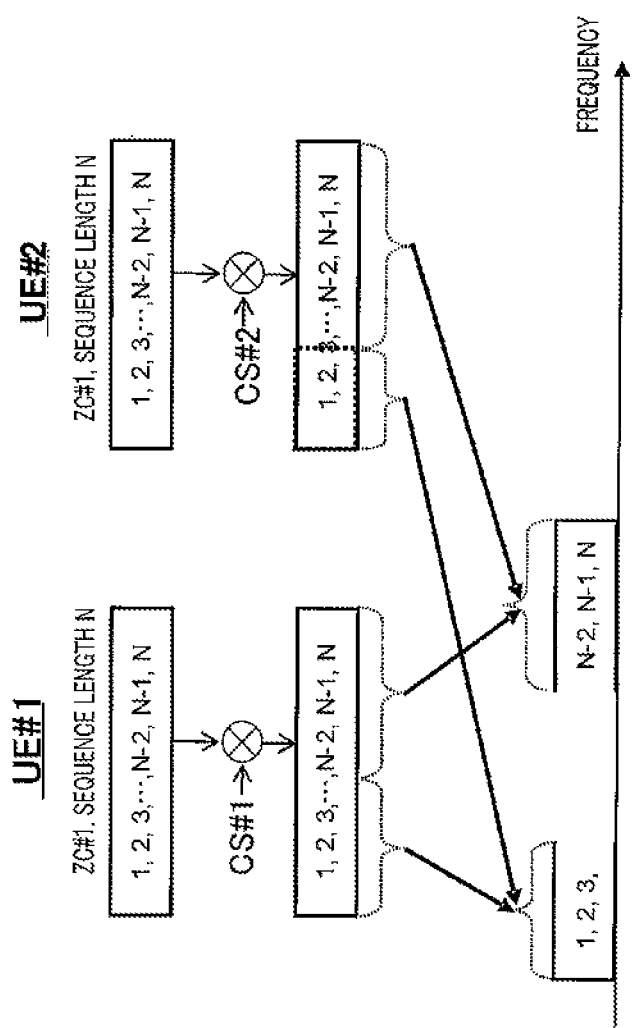
FIG. 19 illustrates the state of limiting frequency resource allocation so that components of ZC sequences match between terminals.

When two terminals are MU-MIMO multiplexed on a cluster basis using the DM-RS transmitting technique illustrated in FIG. 15, the allocation of frequency resources is limited so that ZC sequence components (1, 2, 3, ..., N-2, N-1, and N) are matched between the terminals, as illustrated in FIG. 19. When the DM-RSs having different ZC sequence components are code multiplexed, an interference component (cross-correlation) occurs and then the orthogonality of the CS-ZC sequences is broken, as when the ZC sequences having different sequence numbers are code multiplexed. In order to maintain the orthogonality of the CS-ZC sequences, the non-contiguous band allocation of two different terminals need to be perfectly matched (all cluster hands need to be matched). As a result, the frequency scheduling of MU-MIMO multiplexing is restricted and therefore the system throughput performance is deteriorated.

Figure 20:
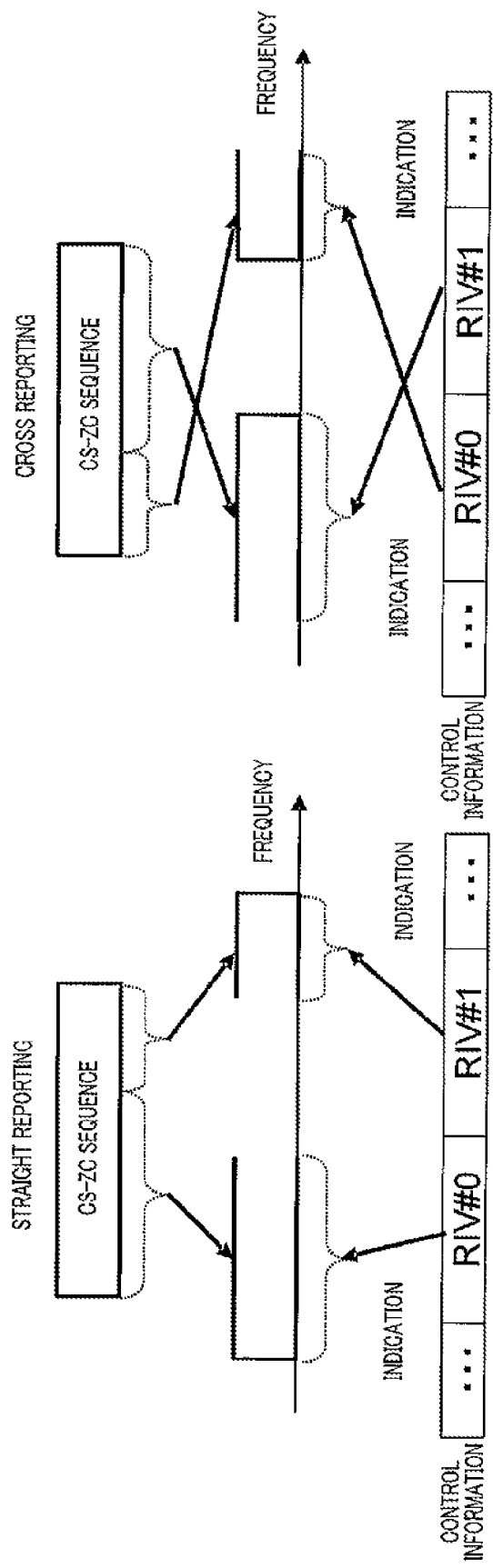
FIG. 20 illustrates the state of associating a RIV reporting technique with a cluster allocating technique of DM-RS sequences.

In this case, DM-RS sequence mapping determining section 302 of embodiment 2 indicates the non-contiguous band allocation technique of the DM-RSs so as to equalize the ZC sequence components. Also, as illustrated in FIG. 20, the RIV reporting techniques are associated with the cluster allocating techniques of the DM-RS sequence to prevent an increase in the number of signaling bits. In particular, the straight reporting allocates the DM-RSs to the clusters in the reported order of the RIVs. The cross reporting allocates the DM-RSs to the clusters in the opposite of the reported order of the RIVs. In this manner, the indication of the DM-RS non-contiguous hand allocation so as to equalize the ZC sequence components can maintain the orthogonality by the CS-ZC sequences on the cluster basis. By this means, the number of signaling bits can be zero, and it is also possible to enhance the frequency scheduling flexibility in MU-MIMO multiplexing and to improve the system throughput performance.

According to embodiment 2, even when the DM-RS sequence for the non-contiguous band allocation dividing a single ZC sequence into a plurality of clusters, mapping the DM-RS sequences to the non-contiguous bands so as to equalize the ZC sequence components can enhance the frequency scheduling flexibility in the MU-MIMO multiplexing.

Figure 21:
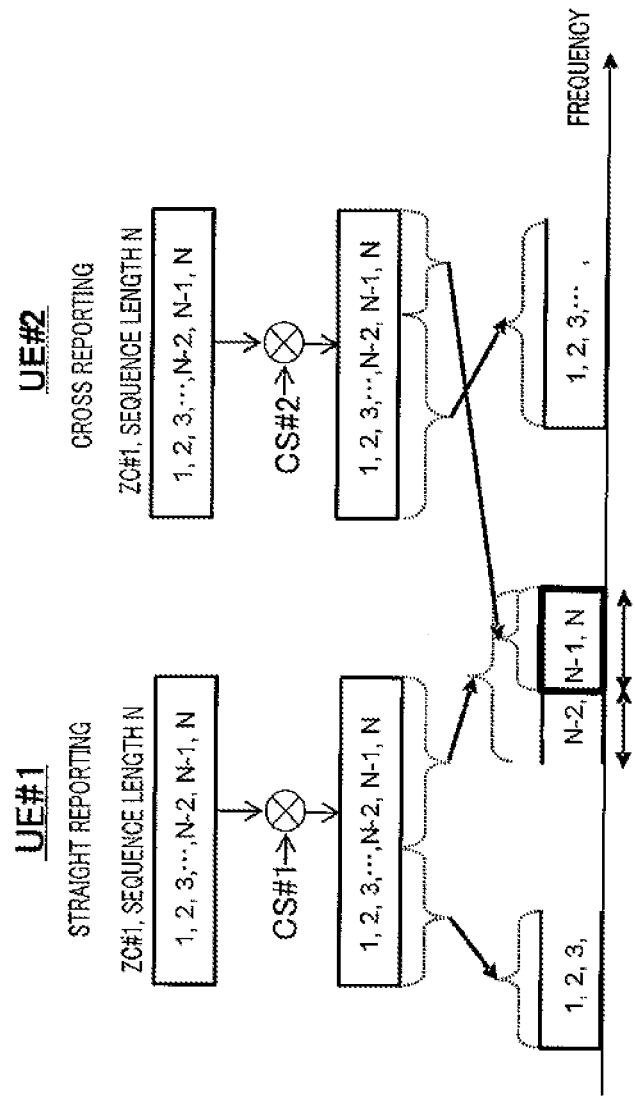
FIG. 21 illustrates the state of processing an MU-MIMO band and a Non-MIMO band as different clusters.

In the present embodiment, when the base station processes a MU-MIMO band and a Non-MIMO band as different clusters in its reception process, the CS-ZC sequences can orthogonalize the DM-RSs as illustrated in FIG. 21.

Figure 22:
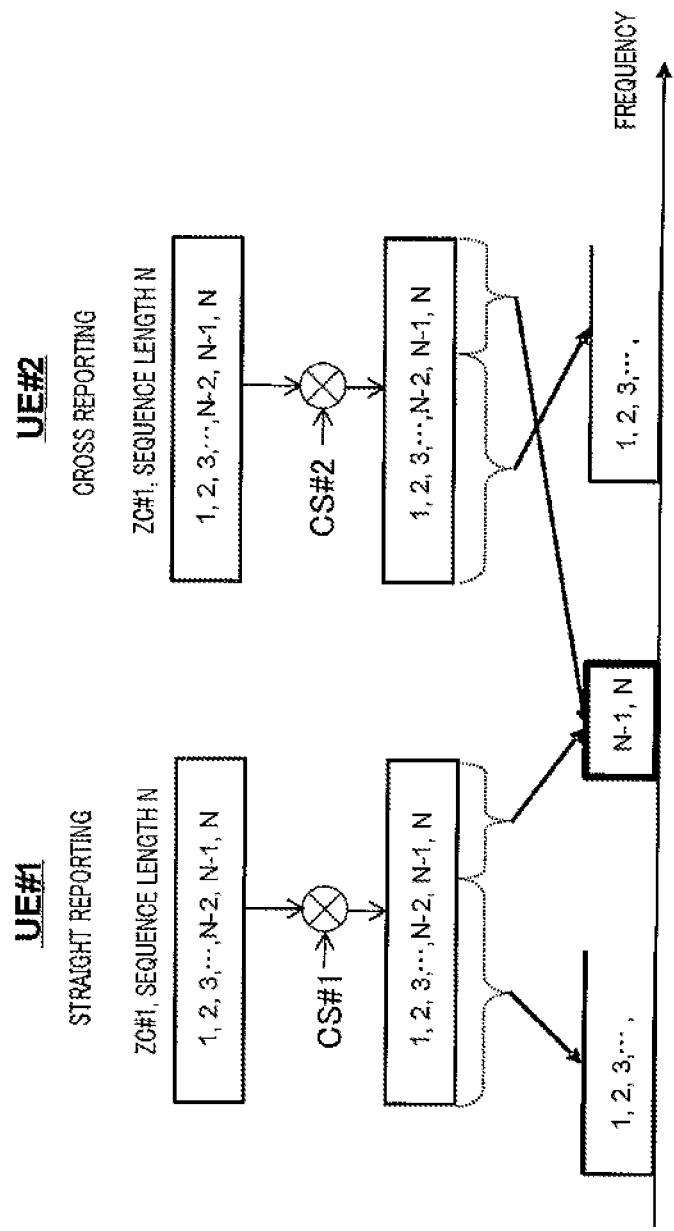
FIG. 22 illustrates the state of demodulating the clusters in a single operation.

Also, in the present embodiment, when scheduling bandwidths of the clusters to be MU-MIMO multiplexed to be the same between the terminals, the base station can reduce the amount of the reception processing of the base station. As illustrated in FIG. 22, since the same cluster to be MU-MIMO multiplexed is used, it is possible to demodulate the clusters in a single operation and then to reduce the amount of the demodulation processing.

Although the present embodiment has explained that the number of clusters reported by the RIVs is two, the present invention is not limited to this and the number of the clusters may be more than two. As in FIG. 16, the number of comparison patterns between the bands in the RIV reporting technique increases with the number of reporting RIVs. Accordingly, increase in the number of the patterns of the DM-RS non-contiguous baud allocation associated with the comparison patterns decreases the number of signaling bits as with embodiment 2.

The ZC sequence component in the present embodiment can be referred to as a sample number, a symbol number or an index of the ZC sequence.

The control information associated with the comparison between the bands indicated by a plurality of RIVs may be the information unrelated to the DM-RS. Information related to generation of a transmission signal of a terminal can acquire the effect of reducing the amount of signaling. For example, trigger information prompting the terminals to transmit a signal (such as SRS signal and power headroom information) other than data may be transmitted. By this means, it is possible to allow the terminals to transmit a signal required by the base station, without any signaling bit, Also, the Walsh sequence means the sequence of (1,1) or (1,−1), and may have a different name. For example, the Walsh sequence can be referred to as OCC (Orthogonal Cover Code) sequence.

Although a case has been described with the above embodiments as an example where the present invention is implemented with hardware, the present invention can be implemented with software in cooperation with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

The method of implementing integrated circuitry is not limited to LSI, and implementation by means of dedicated circuitry or a general-purpose processor may also be used. After LSI manufacture, utilization of an FPGA (Field Programmable Gate Array) or a reconfigurable processor where connections and settings of circuit cells in an LSI can be regenerated is also possible.

In the event of the introduction of an integrated circuit implementation technology whereby LSI is replaced by a different technology as an advance in, or derivation from, semiconductor technology, integration of the function blocks may of course be performed using that technology. Application of biotechnology is also possible.

Although the present invention has been described above with embodiments using antennas, the present invention is equally applicable to antenna ports.

An antenna port refers to a theoretical antenna comprised of one or a plurality of physical antennas. Thus, an antenna port is not limited to represent one physical antenna, and may be for example an array antenna formed by a plurality of antennas.

For example, 3GPP LTE does not define the number of physical antennas for forming an antenna port, but defines an antenna port as a minimum unit for transmitting different reference signals from a base station.

In addition, an antenna port may be defined as a minimum unit to multiply weighting of a precoding vector.

The disclosure of Japanese Patent Application No. 2010-064430, filed on Mar. 19, 2010, including the specification, drawings and abstract, is incorporated herein by reference in its entirety.

INDUSTRIAL APPLICABILITY

The radio communication apparatus and the radio communication method according to the present invention can be applied to a mobile communication system such as LTE-Advanced, for example.

REFERENCE SIGNS LIST 101, 201 Antenna
102, 202 Reception section
103, 224 Demodulation section
104 Scheduling information decoding section
105, 208 RIV information extracting section
106, 217 CS extracting section
107, 210 Walsh sequence information extracting section
108, 211 Walsh sequence number determining section
109, 214, 301 DM-RS sequence generating section
110 Phase rotating section
111, 303 Mapping section
112, 212 Walsh sequence multiplying section
113, 216, 223 IFFT section
114 CP adding section
115 Transmission section 203 CP removing section
204 Demultiplexing section
205, 220 FFT section
206 Scheduling section
207 Storage section
209, 221, 402 Demapping section
213 In-phase addition section
215 Division section
218 Masking processing section
219 DFT section
222 Frequency domain equalizing section
225 Decoding section
302, 401 DM-RS sequence mapping determining section

The invention claimed is:

1. A radio communication apparatus comprising:
 a reception section configured to receive a signal including a plurality of continuous band allocation information indicating continuous band allocation; and
 an acquisition section configured to acquire control information corresponding to the received plurality of continuous band allocation information based on a relationship where a band reporting order for bands indicated by the plurality of continuous band allocation information is associated with the control information.

2. The radio communication apparatus according to claim 1, wherein the control information is information that indicates a sequence by which a reference signal arranged in a cluster are multiplied, the cluster being the continuous bands.

3. The radio communication apparatus according to claim 1, wherein the control information is allocation information that indicates a method to allocate a code sequence used for a reference signal to a cluster, the reference signals being arranged in the cluster that is the continuous bands.

4. The radio communication apparatus according to claim 1, wherein the control information is allocation information that indicates a method to allocate a code sequence to a cluster that is the continuous bands on the basis of the band reporting order and code sequence information indicating a code sequence by which a reference signal arranged in the cluster are multiplied, the cluster being the continuous bands.

5. A radio communication method comprising the steps of:
 receiving a signal including a plurality of continuous band allocation information indicating continuous band allocation; and
 acquiring control information corresponding to the received plurality of continuous band allocation information based on a relationship where a band reporting order for bands indicated by the plurality of continuous band allocation is associated with the control information.

* * * * *